Dec. 5, 1961 J. C. KENT 3,012,231

ELECTRICAL APPARATUS FOR STORING DIGITAL INFORMATION

Filed Oct. 10, 1956 2 Sheets-Sheet 1

INVENTOR.
JOHN C. KENT
BY Henry L. Hanson
ATTORNEY

Dec. 5, 1961 J. C. KENT 3,012,231

ELECTRICAL APPARATUS FOR STORING DIGITAL INFORMATION

Filed Oct. 10, 1956 2 Sheets-Sheet 2

INVENTOR.
JOHN C. KENT
BY Henry L. Hanson
ATTORNEY

United States Patent Office 3,012,231
Patented Dec. 5, 1961

3,012,231

ELECTRICAL APPARATUS FOR STORING DIGITAL INFORMATION

John C. Kent, Lexington, Mass., assignor, by mesne assignments, to Minneapolis-Honeywell Regulator Company, a corporation of Delaware Filed Oct. 10, 1956, Ser. No. 615,036
15 Claims. (Cl. 340—174)

A general object of the present invention is to provide a new and improved electrical apparatus for the storage of digital information. More specifically, the present invention is directed to a magnetic type of digital information storage circuit which is characterized by its freedom from electromagnetic pickup in the output circuit thereof.

In electrical data processing machines, bistable storage devices such as magnetic cores of ferro-electric members are used for the storing of binary information. These storage elements are characterized by their having rectangular hysteresis characteristics with large residual flux characteristics when the storage element is switched into one condition or another. As these elements are two state elements, they are particularly adapted to store binary digits or bits therein. In order to store a large number of bits a number of these storage elements may be formed in a matrix. This matrix may be arranged in planar form with a plurality of wires passing through the elements of the matrix to provide a means for entering and withdrawing information from the matrix. A representative form of a storage matrix incorporating the storage elements used in the present invention will be found in the Forrester patent, No. 2,736,880, issued February 28, 1956. As disclosed in the Forrester patent, the storage elements are arranged in a series of planes so that there is in effect a three dimensional storage array. Any particular storage element in the array may be examined by means of a plurality of selection wires which thread each of the storage elements. If there is a preselected coincidence of electrical signals on the selection wires threading any particular core, that core will be caused to switch from a first stable state to a second stable state. When this switching takes place, there will be a signal induced in a sense wire threading that particular core.

As memory storage arrays of the present type do not operate with large signal levels, the selecting of a signal from one particular storage element is difficult due to the presence of noise and pickup of an unwanted nature present in the circuit. The pickup which is unwanted may arise from several sources. One such source is the current flowing in a single selection wire which passes through a series of cores where there is no coincidence with another selection wire passing through the same core. This is sometimes referred to as a half selection signal which, while not actually changing the state of the core, nevertheless has the effect of introducing a small unwanted signal into the system. This particular effect may be minimized by arranging the output sense wire for the array so that there is a canceling of the unwanted signal.

It is therefore a more specific object of the present invention to provide a sense winding for a storage array arranged so as to minimize electromagnetic pickup within the array and from external sources with respect to the array.

The foregoing object of the invention is achieved by a novel arrangement of the sense winding for the storage array where the array is divided into quadrants, not necessarily of equal size, where the sense winding is wound so that the winding may be passed along the storage elements without extending for any great distance outside the array where magnetic pickup becomes a problem.

Further, this type of winding should also be arranged so that the winding passes through each storage element once and only once; and the number of elements inducing positive and negative outputs in the winding must be equal for any row and column combination.

It is therefore a further more specific object of the invention to provide an improved storage element array having a sense winding arranged so that the sense winding is positioned in quadrants in the array to minimize the effects of unwanted signals.

Still another more specific object of the invention is to provide a multiple storage element array having a sense winding arranged so that the sense winding, when passing from one row in the array to another, re-enters the array on the same side that the winding left the array.

The various features of novelty which characterize the invention are pointed out with particularity in the claims annexed to and forming a part of the present specification. For a better understanding of the invention, its advantages, and specific objects attained with its use, reference should be had to the accompanying drawings and descriptive matter in which there is illustrated and described a preferred embodiment of the invention.

Figure 2:
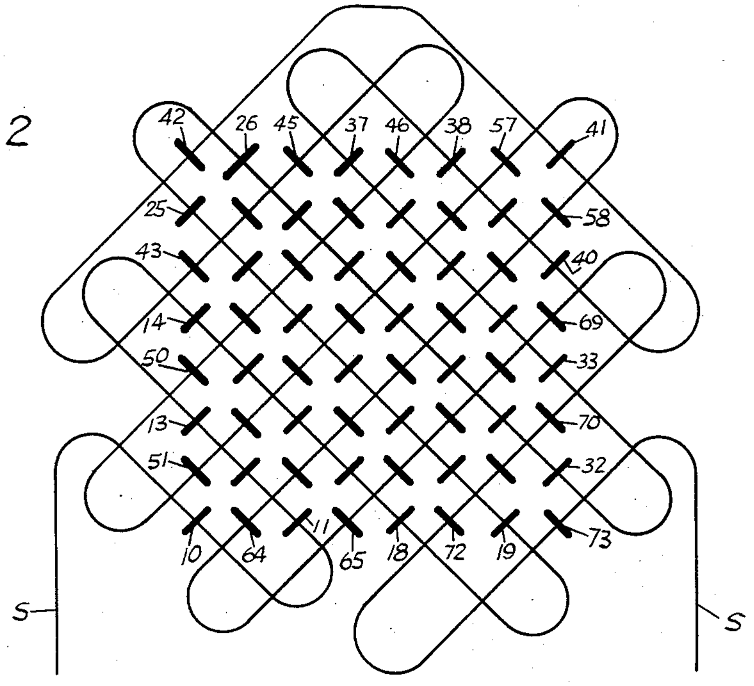
FIGURE 2 shows a representative prior art method of winding the sense winding with respect to a plurality of storage elements in an array.
Figure 3:
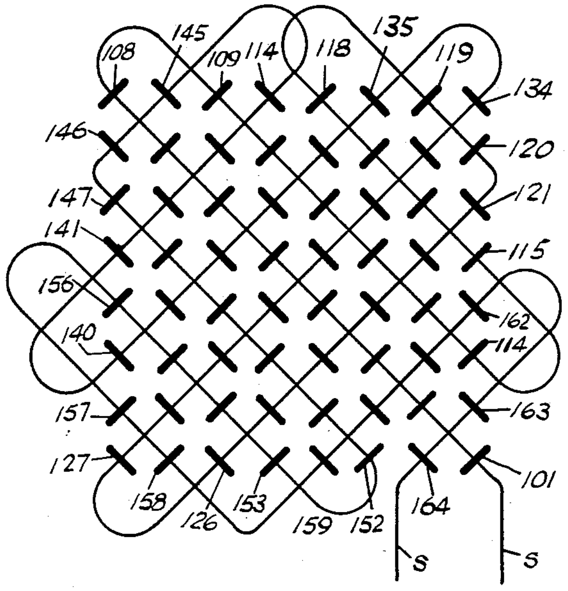
FIGURE 3 shows the sense winding arrangement of the present invention applied to a magnetic core storage array.
Figure 1:
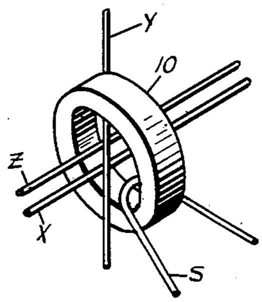
FIGURE 1 is a showing of a magnetic core type storage element adapted for use in a storage array of the present invention.

Referring first to FIGURE 1, there is here shown a ferrite core 10 used as a bistable storage element in the arrays shown in FIGURES 2 and 3. This ferrite core has a rectangular hysteresis characteristic with a large residual magnetism. The core is adapted to be set in one bistable state or the other by the application thereto of a current signal of a predetermined magnitude. In order to set the core 10 to a selected binary state, there are provided a plurality of input wires X, Y, and Z. When it is desired to write a signal into the core 10 so that the core may store the same, it is necessary that a current signal pass through the X wire and the Y wire and that the total current resulting from the signals in the X and Y wires be equal to a predetermined amount sufficient to switch the bistable state of the core from a first state to a second state, if the core is not already in that second state. The current necessary to set the core is generally referred to as I while the current is flowing in the X direction and the current in the Y wire will be $I/2$. The sum of the currents in the X and Y wires will be I. If it is desired to prevent the changing of the state of the core 10, when there is a coincidence between the currents in the X and Y wires, an inhibit current equal to a minus $I/2$ is passed through the Z wire and this will mean that the net current flowing through the wires passing to the core 10 will be $I/2$ which is insufficient to set the core and the core will remain in its existing state.

When it is desired to read out a signal from the core 10, a signal will be applied to the X and Y wires with a polarity opposite the polarity used during the read in. With the two currents added in the core 10, the core will be switched from its set state back to the opposite state and when so switched, the flux change in the core will induce a signal in the output sense winding S. After the read out, the core 10 will be in a state ready for the writing in of additional information by way of the X and Y wires with a current pulse opposite that used to read the information out of the core. For a more complete understanding of the principles of the elements incorporated in FIGURE 1, reference should be had to the aforementioned Forrester patent.

FIGURES 2 and 3 incorporate a plurality of storage elements of the type shown in FIGURE 1 and each of the storage elements is adapted to have passed therethrough four separate wires in the manner set forth in FIGURE 1. In order to facilitate an understanding of the present invention, the only winding shown in FIGURES 2 and 3 is the sense winding. However, it is to be understood that the other windings essential to the writing in and the reading out of information from the selected cores would be incorporated in any complete embodiment of the arrays shown.

Referring to FIGURE 2, this figure represents a prior art method of arranging the sense winding with respect to a plurality of storage elements in a storage array. The array shown in FIGURE 2 is an 8 x 8 array, with the storage elements being arranged in rows and columns in the form of a rectangle. The storage elements are each presumed to have a planar surface and the planar surfaces of adjacent storage elements in each row and column are displaced 90° with respect to each other thus facilitating the passing of the sense winding through the respective cores. As shown in FIGURE 2, the storage array is arranged so that there is a plurality of diagonal rows of the storage elements extending diagonally across the array with the planar surface element of the elements in the diagonal rows being in alignment.

As shown in FIGURE 2, the sense winding S enters the storage array by way of the core 10 and extends over to the diagonal row started by the core 11 and passes through the cores to the core 13. The winding then extends so that it will pass into the next diagonal row started by the core 14, extends through the cores therein to exit by way of the core 18. The winding continues entering array at core 19 and extending along the diagonal row of elements to the core 25. The winding then continues and re-enters the array at core 26, extending along the diagonal row to exit by way of core 32. Sense winding continues re-entering the array at core 33 and extending along the diagonal row to the core 37 and then again re-entering the array at core 38 and extending to core 40. The winding then continues from the core 40 extending through the core 41. At this point, the sense winding extends from the core 41 over to the core 42 at which time the winding starts to be threaded through to the cores along the diagonal rows which are 90° displaced from the diagonal rows for the cores 10 through 41.

When the sense winding passes through the core 42, it is arranged to extend through the subsequent diagonal rows formed by the cores 42 through 73. It will be noted that the exit core where the sense winding pass is the core 73 and that this core is at the opposite side of the array from which the winding entered the array.

There are two difficulties inherent in the winding of the type shown in FIGURE 2 particularly in the matter of electromagnetic pickup. First, by having the sense winding S enter the array at two widely displaced points, it is necessary that these windings be brought together and the length of the leads leading to the array, when so displaced, inherently increases the amount of lead wire which is susceptible to stray electromagnetic fields. Another difficulty inherent in the circuit of FIGURE 2 lies in the long lead wire extending from the first section winding, which may be defined as the winding extending from the core 10 to the core 41, and the second section, defined by the winding extending to the cores 42 through 73. This lead wire is the wire extending from the core 41 to the core 42 and is likewise very susceptible to stray electromagnetic fields and will induce undesirable signals in the sense winding in the absence of elaborate shielding and isolating techniques. The resultant unwanted signals may be sufficient to swamp out a signal derived from a single core which is being examined and consequently, this type circuit is difficult to use without elaborate protective and isolation circuitry.

The circuit of FIGURE 3 incorporates the same basic array set forth in FIGURE 2 except that here the sense winding in the storage elements have been so arranged that it is possible to minimize the unwanted electromagnetic pickup in the sense winding. As with FIGURE 2, the array of FIGURE 3 incorporates an 8 x 8 storage element array.

The winding S is arranged to enter the array by way of the core 101 and extends along the diagonal row started by the core 101 to the core 108. The winding S continues and re-enters the array at core 109 and extends along the diagonal row to core 114 where it exits from the array and then returns to the array by way of a diagonal row started by the core 115. The winding continues along the diagonal row and exits at core 118 and then re-enters at core 119 where it continues and exits at core 120. The section of the winding thus far traced may be termed the first section or first quadrant of the winding of the array.

The winding continues in its course through a further diagonal started by the core 121 and exiting at core 126 whereupon it re-enters at core 127 and extends along the diagonal thereof to core 134. The winding S re-enters the array at core 135 and extends along the diagonal to the core 140 and then re-enters the array at core 141. The winding continues from the core 141 through the core 144 out of the array and back to the diagonal formed by the cores 145 and 146. This portion of the winding which has been traced from the cores 121 through 146 may be termed the second section or second quadrant of of the winding.

The third section or quadrant of the winding is formed by the sense winding passing from the core 147 along the diagonal to the core 152, then to the core 153 and along the diagonal back to the core 156. The winding then passes through the core 157 and core 158 to complete the third section or quadrant.

The winding S then continues and extends from the core 158 to the next diagonal from core 159 through core 162 and back to the cores 163 and 164 to the output. This latter winding is the fourth section or quadrant of the winding.

In reviewing the winding shown in FIGURE 3, it will be noted that the winding S enters and exits the array by way of two storage elements which are adjacent in the array, the elements 101 and 164. It will further be noted that the windings of the array have been arranged so that they are divided into four separate sections as contrasted from the two sections set forth in FIGURE 2. These four sections or quadrants have been arranged so that when the sense winding passes from one diagonal row to the next, the lead will bypass only a fraction of the total cores on the side of the array. The maximum number of cores skipped in the present arrangement is where the winding lead extends from core 158 to core 159 with the cores 126 and 153 being skipped. This should be contrasted with the lead between cores 41 and 42 in FIGURE 2. This arrangement in FIGURE 3 permits a considerable reduction in the lead length between diagonal rows and considerably reduces the effect of external electromagnetic pickup.

In addition, this winding configuration, wherein there are four principal sections, lends itself to a winding method where the winding may be accomplished by using shorter sections of wire than generally used where there are two sections as in FIGURE 2. That is, when four sections are used, a separate wire may be conveniently used for each section. When complete, the wires may be joined together and a break then made in the complete loop; preferably at adjacent cores somewhere along the edge to provide suitable external connections for the sense winding.

For a core array of the type shown in FIGURE 3, it is possible to set down a set of rules by which the winding should be arranged as it threads the cores of the array. The following rules are representative and demonstrate one criteria for the winding arrangement in this type of array:

(1) Starting in the square at any one core positioned at a corner of said square and proceed along the diagonal row of cores containing the starting core;

(2) Proceed along each alternate parallel diagonal row of cores by entering each such alternate row by the core most closely adjacent the core at the end of the preceding alternate row until a diagonal row of two cores has been traversed;

(3) Enter an adjacent diagonal row of cores disposed along a diagonal crossing the diagonal rows previously traversed;

(4) Proceed along each alternate parallel row of cores progressing in a direction away from said initial entering point by entering each such alternate row in accordance with Rule 2 until a diagonal row of two cores has been traversed;

(5) Enter the most closely adjacent diagonal row of cores crossing the immediately preceding row of diagonal cores which most closely adjacent row has not previously been traversed by said winding;

(6) Proceed along each alternate parallel diagonal row of cores, not previously traversed by said winding, in accordance with Rule 2 until a diagonal row of two cores has been traversed;

(7) Enter the most closely adjacent diagonal row of cores crossing the immediately preceding rows of diagonal cores, which most closely adjacent row has not previously been traversed by said winding; and (8) Proceed along each alternate parallel diagonal row of cores, not previously traversed by said winding, in accordance with Rule 2 until all remaining cores have been linked.

In FIGURE 3, the corners of the array are rounded, that is, they have cores at the corner positioned so that their planar surfaces face outward from the corner. This configuration is preferred for a square array having a number of cores on a side, when divided by two equals an even number. Thus, with 8 cores on a side, divided by two yields a 4. If the number of cores on a side divided by two equals an odd number, the corner cores should point outward in the manner shown in FIGURE 4, the latter being a 10 x 10 array.

Figure 4:
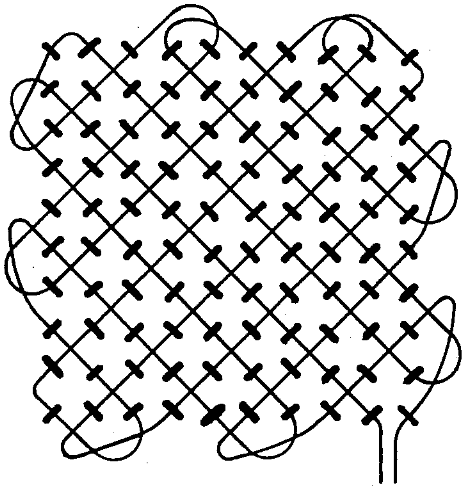
FIGURE 4 shows the sense winding applied to a 10 x 10 core array.

As with the arrangements of FIGURE 3, the sense winding is wound making four principal passes through the array to thereby divide the winding into quadrants. Another representative set of rules for the placement of the winding in FIGURE 4 is as follows:

(1) Start a first path along a diagonal formed by a first corner core;

(2) Proceed along alternate diagonals toward a second corner core;

(3) Start a second path through the second corner core from the diagonal immediately prior to the second corner core and along a core diagonal which crosses the first path diagonals;

(4) Proceed along the alternate diagonals toward a third corner core;

(5) Start a third path through the third corner core from the diagonal immediately prior to the third corner core and along a core diagonal parallel to said first diagonal;

(6) Proceed along alternate diagonals toward the fourth corner core;

(7) Start a fourth path through the fourth corner core from the diagonal immediately prior to the fourth corner core and along a diagonal parallel to the diagonals of step 3; and (8) Proceed along alternate diagonals until all remaining cores have been threaded.

In FIGURE 3, it will be noted that the array of cores are formed as a square. The array may be formed as a rectangle with more cores on one side than on the other. Thus, in FIGURE 5, there is shown a core array formed as a rectangle having six cores on one side and eight cores on the other. The cores have the sense winding positioned in the array according to the following set of rules.

(1) Starting the path at a first corner core and proceed along the diagonal started by that core to the other side of said array;

(2) Re-enter said array on a parallel diagonal removed from said first diagonal and continue along every other diagonal until two cores are threaded;

(3) Re-enter said array on a core on the same side of the array as one of said two cores of Step 2 to start a diagonal crossing the diagonals traversed in Step 2 and continue along every other diagonal until two cores are threaded opposite the corner of entry;

(4) Re-entering the array on the same side as the exit side on the next diagonal not already threaded which is parallel to the diagonal of Step 1 and continuing along every other diagonal to the third corner; and (5) Re-entering the array on the next core not already threaded and continue along every other diagonal crossing the diagonals of Step 3 toward the starting corner where the remaining cores are threaded.

Figure 5:
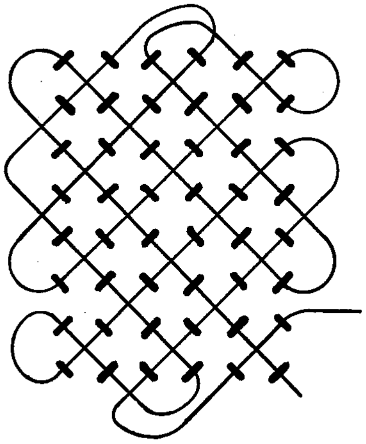
FIGURE 5 shows an 8 x 6 core array with the sense winding used therewith.

By following the foregoing set of rules in FIGURE 5, it will be apparent that the sense winding has passed through four quadrants of the array or, in other words, has been arranged so that four separate bi-directional passes have been made in threading the cores of the array.

Figure 6:
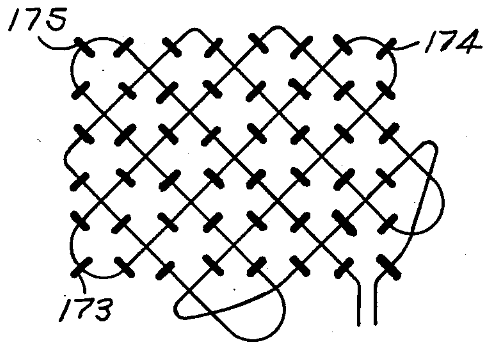
FIGURE 6 shows a modified 8 x 6 core array using the principles of the present invention.

As with FIGURE 3, the windings of FIGURES 4 and 5 may be arranged so that the actual exit is at any point therein and need not be at the corner as shown. The important criteria is that there be a short distance between the cores where the exit is actually made and that the winding not leave the array on one side and extend to a point on another side of the array. In some types of arrays, depending on the number of cores involved, one or more of the four passes made by the main winding may pick up a corner core which is at right angles to the cores in the diagonals being traversed. An example of this is shown in FIGURE 6 where the corner cores 173, 174 and 175 are picked up by the winding when threading the diagonals formed by the cores at right angles thereto. This does not affect the basic concepts set forth above.

It will be apparent that while specific types of arrays have been shown in the figures, the principles of the present invention are applicable to any size array. Further, while the invention has been discussed in terms of a magnetic core as the storage element, the principles of the invention are equally applicable to other types of storage elements wherein a sense winding is passed through or beside an associated bi-stable storage device.

While, in accordance with the provisions of the statutes, there has been illustrated and described the best form of the invention known, it will be apparent to those skilled in the art that changes may be made in the form of the apparatus disclosed without departing from the spirit of the invention as set forth in the appended claims, and that in some cases, certain features of the invention may be used to advantage without a corresponding use of other features.

Having now described the invention, what is claimed as new and for which it is desired to secure by Letters Patent is:

1. In a magnetic core array, the combination comprising a plurality of bistable planar magnetizable cores arranged in an array, said cores being arranged in columns and rows with each adjacent core in any row or column having its planar surface displaced approximately 90° with respect to the next core, and a sense winding being wound through said array to intersect each core of the array, said sense winding having input leads entering said array and exiting from said array by way of adjacent cores, and making each exit and entry to the array on the same side of the array.

2. In a magnetic core array, the combination comprising a plurality of bistable planar magnetizable cores arranged in an array, said cores being arranged in columns and rows with each adjacent core in any row or column having its planar surface displaced approximately 90° with respect to the next core, and a sense winding being wound through said array to intersect each core of the array and having connecting leads positioned to enter and exit from said array by way of adjacent cores, said sense winding being wound to divide the array into directional winding paths to minimize magnetic pickup in said sense winding.

3. In a magnetic core plane, the combination comprising a plurality of bistable magnetizable cores arranged in an array, said cores being arranged in columns and rows with each adjacent core in any row or column being displaced approximately 90° with respect to the next core, and a sense winding being wound through said array to intersect each core of the array and having connecting leads therefor entering said array and exiting from said array by way of adjacent cores, said sense winding being passed diagonally through said cores and passing from the end of one diagonal row to the next on the same side of the rectangular array as the previous diagonal row termination.

4. In a magnetic core plane, the combination comprising a plurality of bistable magnetic cores having a planar surface arranged in a plane, said cores being arranged in columns and rows with each adjacent core in any row having its planar surface displaced approximately 90° with respect to the next adjacent core so that diagonal rows are formed with the planar surfaces being aligned, and a sense winding passing through each of said cores and extending through the cores along the diagonal rows with said sense winding having terminating leads entering said plane and exiting from said plane by way of adjacent cores.

5. In a magnetic core array, the combination comprising a plurality of bistable magnetic cores arranged in rows and columns in a plane, said cores when in said columns and rows forming diagonal rows with respect to said first rows and columns, and a sense winding positioned to intersect the field of each of said cores positioned along said diagonal rows so that said winding passes on each pass from one diagonal row to the next diagonal row is passed by way of cores on the same side of said rectangular plane, said winding further having a pair of terminating leads positioned to enter and exit from said array by way of cores on the same side of the array.

6. In a magnetic core array, the combination comprising a plurality of toroidal bistable magnetic cores having a planar surface arranged in a plane, said cores being arranged in columns and rows with each adjacent core in any row having its planar surface displaced approximately 90° with respect to the next adjacent core so that diagonal rows are formed with the planar surfaces aligned, and a sense circuit positioned to extend through each of said cores, said sense circuit extending along said diagonal rows so that said circuit passes from one diagonal row to the next diagonal row on the same side of said plane and includes connecting leads positioned to enter and exit from said plane by way of two adjacent cores.

7. A multiple element storage array comprising a plurality of bi-stable storage elements arranged in columns and rows to form a rectangle, and a sense winding positioned to electrically intersect each of said elements, said sense winding being arranged in four directional winding paths, each of which are separate and directionally crossing within the array, to minimize lead lengths of said winding at the entry to said array and as said winding is passed from one part of the array to another.

8. In a magnetic core array, the combination comprising a plurality of bistable magnetic cores arranged in rows and columns in a rectangular plane, said cores when in said rows and columns forming diagonal rows with respect to said first rows and columns, and a sense winding positioned to intersect once the field of each of said cores, said sense winding being positioned along said diagonals in said array so that at least four separate and directionally crossing bi-directional passes are made in passing through said array.

9. In a magnetic core array, the combination comprising a plurality of bistable magnetic cores arranged in rows and columns in a rectangular plane, said cores when in said rows and columns forming diagonal rows with respect to said first rows and columns, and a sense winding positioned to intersect once the field of each of said cores, said sense winding being positioned along said diagonals in said array so that ae least four separate and directionally crossing bi-directional passes along selected alternate parallel diagonals are made in passing through said array.

10. In a core storage apparatus, the combination comprising a plurality of bistable magnetizable cores mounted in an array, said cores being arranged in columns and rows and spaced so that diagonal rows in two directions are formed, and a conductor threaded through said array so that each core is threaded once and only once, said conductor being physically postioned in said array along a path that may be traced through said array as follows:

(1) Starting the path at a first corner core and proceed along the diagonal started by that core to the other side of said array;

(2) Re-enter said array on a parallel diagonal removed from said first diagonal and continue along every other diagonal until two cores are threaded;

(3) Re-enter said array on a core on the same side of the array as one of said two cores of Step 2 to start a diagonal crossing the diagonals traversed in Step 2 and continue along every other diagonal until two cores are threaded opposite the corner of entry;

(4) Re-entering the array on the same side as the exit side on the next diagonal not already threaded which is parallel to the diagonal of Step 1 and continuing along every other diagonal to the third corner; and (5) Re-entering the array on the next core not already threaded and continue along every other diagonal crossing the diagonals of Step 3 toward the starting corner where the remaining cores are threaded.

11. The combination comprising a plurality of bistable magnetizable cores, said cores being arranged in columns and rows, all of said columns and rows having the same even number of cores whereby a substantially square array of cores is produced and with the cores forming diagonals across said square, a conductor linked to each of said cores to produce a linkage winding through said array, said linkage winding being positioned in said square to thread the cores thereof along a path that may be traced as follows:

(1) Starting in the square at any one of the three cores positioned adjacent any one corner of said square and proceed along the diagonal row of cores containing the entering core;

(2) Proceed along each alternate parallel diagonal row of cores by entering each such alternate row by the core most closely adjacent the core at the end of the preceding alternate row until a diagonal row of two cores has been traversed;

(3) Enter an adjacent diagonal row of cores disposed along a diagonal crossing the diagonal rows previously traversed;

(4) Proceed along each alternate parallel row of cores progressing in a direction away from said initial entering point by entering each such alternate row in accordance with Rule 2 until a diagonal row of two cores has been traversed;

(5) Enter the most closely adjacent diagonal row of cores crossing the immediately preceding row of diagonal cores which most closely adjacent row has not previously been traversed by said winding;

(6) Proceed along each alternate parallel diagonal row of cores, not previously traversed by said winding, in accordance with Rule 2 until a diagonal row of two cores has been traversed;

(7) Enter the most closely adjacent diagonal row of cores crossing the immediately preceding rows of diagonal cores, which most closely adjacent row has not previously been traversed by said winding; and (8) Proceed along each alternate parallel diagonal row of cores, not previously traversed by said winding, in accordance with Rule 2 until all remaining cores have been linked.

12. In a core storage apparatus, the combination comprising a plurality of bistable magnetizable cores, said cores being arranged in columns and rows and spaced so that diagonal rows in two directions are formed, and a conductor threaded through said array so that each core is threaded once and only once, said conductor being positioned in said apparatus along a path that may be traced through said array as follows:

(1) Start a first path along a diagonal formed by a first corner core;

(2) Proceed along alternate diagonals toward a second corner core;

(3) Start a second path through the second corner core from the diagonal immediately prior to the second corner core and along a core diagonal which crosses the first path diagonals;

(4) Proceed along the alternate diagonals toward a third corner core;

(5) Start a third path through the third corner core from the diagonal immediately prior to the third corner core and along a core diagonal parallel to said first diagonal;

(6) Proceed along alternate diagonals toward the fourth corner core;

(7) Start a fourth path through the fourth corner core from the diagonal immediately prior to the fourth corner core and along a diagonal parallel to the diagonals of Step 3; and (8) Proceed along alternate diagonals until all remaining cores have been threaded.

13. In a magnetic core array the combination comprising a plurality of toroidal bistable magnetic cores having a planar surface arranged in a plane, said cores being arranged in columns and rows with each adjacent core in any row having its planar surface displaced approximately 90° with respect to the next adjacent core so that diagonal rows are formed with the planar surfaces aligned, said cores further being arranged so that the cores at the corner of said plane have their planar surfaces facing outward from the corner of the plane, and a sense circuit positioned to extend through each of said cores, said sense circuit extending along said diagonal rows so that said circuit passes from one diagonal row to the next diagonal row on the same side of said plane and including connecting leads positioned to enter and exit from said plane by way of two adjacent cores.

14. In a magnetic core array, the combination comprising a plurality of toroidal bistable magnetic cores having a planar surface arranged in a plane, said cores being arranged in columns and rows with each adjacent core in any row having its planar surface displaced approximately 90° with respect to the next adjacent core so that diagonal rows are formed with the planar surfaces aligned, said cores further being arranged so that the cores at the corner of said plane have their planar surfaces aligned with the corner of the plane, and a sense circuit positioned to extend through each of said cores, said sense circuit extending along said diagonal rows so that said circuit passes from one diagonal row to the next diagonal row on the same side of said plane and includes connecting leads positioned to enter and exit from said plane by way of two adjacent cores.

15. In a core storage apparatus, the combination comprising a plurality of bistable magnetizable cores, said cores being arranged in columns and rows and spaced so that diagonal rows in two directions are formed, and a conductor threaded through said array so that each core is threaded once and only once, said conductor being threaded through said array along a path that may be traced as follows:

(1) Entering the array at one corner;

(2) Proceeding along every other diagonal until at least half the parallel diagonals to the opposite corner have been traversed;

(3) Threading the next diagonal crossing the last mentioned diagonal and every other diagonal going toward the center of said array;

(4) Leaving said array before the center diagonal is reached and re-entering said array on the next adjacent core on the diagonal parallel to said diagonal of the second step to thread the remaining diagonals in that plane;

(5) Leaving said array and returning on the next adjacent diagonal parallel to the diagonal of Step 3 and continuing along the unthreaded diagonals in said plane until said winding exits from said array on the core adjacent the core of entry.

References Cited in the file of this patent

UNITED STATES PATENTS

| | | |
|---|---|---|
| 2,691,155 | Rosenberg et al. | Oct. 5, 1954 |
| 2,732,542 | Minnick | Jan. 24, 1956 |
| 2,776,419 | Rajchman | Jan. 1, 1957 |
| 2,784,391 | Rajchman et al. | Mar. 5, 1957 |
| 2,809,367 | Stuart-Williams | Oct. 8, 1957 |
| 2,878,463 | Austen | Mar. 17, 1959 |
| 2,880,406 | Bindon | Mar. 31, 1959 |